US006660226B1

United States Patent
Takaoka et al.

(10) Patent No.: US 6,660,226 B1
(45) Date of Patent: Dec. 9, 2003

(54) LEAD FREE SOLDER AND SOLDERED ARTICLE

(75) Inventors: Hidekiyo Takaoka, Kusatsu (JP); Kiyotaka Maegawa, Hikone (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 09/632,819

(22) Filed: Aug. 7, 2000

(51) Int. Cl.$^7$ .............................................. C22C 13/00
(52) U.S. Cl. ..................... 420/560; 148/400; 228/56.3
(58) Field of Search .................... 148/400; 420/557, 420/560, 561, 562; 228/56.3

(56) References Cited

U.S. PATENT DOCUMENTS 5,691,210 A * 11/1997 Mori et al. ................ 437/8

FOREIGN PATENT DOCUMENTS

| CN | 1205260 | * | 1/1999 |
| JP | 06269983 | * | 9/1994 |
| JP | 2000015476 | * | 1/2000 |
| JP | 2000015478 | * | 1/2000 |

OTHER PUBLICATIONS

Mate '98, 4$^{th}$ Symposium on "Microjoining and Assembly Technology in Electronics", Yokohama, Jan. 29–30, 1998, pp. 285 through 288 and English translation pp. 1 through 10.

* cited by examiner

*Primary Examiner*—Sikyin Ip
(74) *Attorney, Agent, or Firm*—Dickstein, Shapiro, Morin & Oshinsky, LLP.

(57) ABSTRACT

A lead-free solder includes at least one selected from 0.01 to 1% by weight of Co, 0.01 to 0.2% by weight of, Fe, 0.01 to 0.2% by weight of Mn, 0.01 to 0.2% by weight of Cr, and 0.01 to 2% by weight of Pd; 0.5 to 2% by weight of Cu; and 90.5% by weight or more of Sn. This solder exhibits a satisfactory solderability in solder joints and shows a high resistance to electrode leaching upon soldering or when the resulting soldered article is left at high temperatures.

4 Claims, No Drawings

LEAD FREE SOLDER AND SOLDERED ARTICLE

BACKGROUND OF THE INVENTION

1. Field of the Invention

The present invention relates to solders and to soldered articles.

2. Description of the Related Art

Solders are conventionally used to electrically or mechanically connect electronic devices and electronic parts. As such solders, a solder mainly containing Sn and Pb (hereinafter referred to as "Sn—Pb solder") has been generally employed. In consideration of global environment, however, solders mainly including Sn and containing, for example, Ag, Bi, Cu, In, or Sb as balance and containing no lead (Pb) (hereinafter referred to as "Pb free solder") have been in use. Soldered articles having electrical joints with satisfactory solderability are produced by using these Pb free solders.

However, soldered articles using solders mainly containing Sn, particularly those using Pb free solders invite electrode leaching upon soldering. In addition, Sn diffuses into an electrode (conductor) when the articles are left at high temperatures or are subjected to heat aging, to thereby deteriorate electrical characteristics and mechanical characteristics of the resulting electronic devices and electronic parts.

SUMMARY OF THE INVENTION

Accordingly, an object of the present invention is to provide a Pb free solder and a soldered article which are resistant to electrode leaching upon soldering or upon heat aging after soldering and exhibits less deteriorated characteristics.

Specifically, the invention provides, in a first aspect, a Pb free solder including at least one selected from 0.01 to 1% by weight of Co, 0.01 to 0.2% by weight of Fe, 0.01 to 0.2% by weight of Mn, 0.01 to 0.2% by weight of Cr, and 0.01 to 2% by weight of Pd; 0.5 to 2% by weight of Cu; and 90.5% by weight or more of Sn.

In a second-aspect, the invention provides a Pb free solder including at least one selected from 0.01 to 0.2% by weight of Mn and 0.01 to 0.2% by weight of Cr; at least one selected from 0.5 to 9% by weight of Ag and 0.5 to 5% by weight of Sb; and 90.5% by weight or more of Sn.

The invention provides, in a third aspect, a Pb free solder including 0.01 to 1% by weight of Co, 0.5 to 9% by weight of Ag, 0.5 to 2% by weight of Cu, and 88.0% by weight or more of Sn.

In a further aspect, the invention provides a soldered article including an article containing a transition metal conductor and being joined through a solder, and the transition metal conductor is liable to spread in molten Sn. In this soldered article, the solder is the Pb free solder according to the first, second or third aspect.

In the invented soldered article, the transition metal conductor may be at least one selected from elementary substances or alloys thereof of the group consisting of Cu, Ag, Ni, Au, Pd, Pt, and Zn.

The use of the invented Pb free solder can yield satisfactory solderability in 'solder joints, can inhibit electrode leaching and can minimize deterioration in electric characteristics, mechanical characteristics, and other various characteristics. Particularly, the use of the invented Pb free solder can inhibit electrode leaching upon soldering and, in addition, can inhibit electrode leaching when the soldered article after soldering is left at high temperatures (e.g., upon heat aging).

The invented Pb free solder is a solution to the electrode leaching problem in conventional Pb free solders and puts such Pb free solders to use. The invention can therefore provide a soldered article applying less load upon environment.

DESCRIPTION OF THE PREFERRED EMBODIMENTS

The present invention will be illustrated in further detail below.

The invented Pb free solder according to the first aspect includes Cu, Sn, and at least one selected from Co, Fe, Mn, Cr, and Pd. The invented Pb free solder according to the second aspect includes Sn, and at least one selected from Mn and Cr, and at least one selected from Ag and Sb. The invented Pb free solder according to the third aspect includes Co, Ag, Cu, and Sn.

The invented soldered article includes an article containing a transition metal conductor and being joined through a solder, and the transition metal conductor is liable to spread in molten Sn. As the solder, the first, second, or third invented Pb free solder is used. This composition can provide a soldered article having a satisfactory solderability and a high bonding strength, and a sufficient resistance to electrode leaching.

According to the invention, Co, Fe, Mn, Cr, or Pb added in a small amount forms a segregation layer at the interface between the conductor and the solder to prevent a reaction between the electrode (conductor) and the molten solder to thereby inhibit electrode leaching.

In the first and third invented Pb free solders, the amount of Co is set to 0.01 to 1% by weight based on the total weight of the solder. If the amount of Co is less than 0.01% by weight, the resistance to electrode leaching is deteriorated, and in contrast, if it exceeds 1% by weight, the liquidus temperature increases to deteriorate melting properties. The amount of Co is preferably in a range from 0.01 to 0.5% by weight and more preferably in a range from 0.4 to 0.5% by weight.

In the first invented Pb free solder, the amount of Fe is set to 0.01 to 0.2% by weight based on the total weight of the solder. If the amount of Fe is less than 0.01% by weight, the resistance to electrode leaching is deteriorated, and in contrast, if it exceeds 0.2% by weight, the liquidus temperature increases to deteriorate melting properties. The amount of Fe is preferably in a range from 0.01 to 0.1% by weight, and more preferably in a range from 0.05 to 0.1% by weight.

The amount of Mn in the first and third invented Pb free solders is set to 0.01 to 0.2% by weight based on the total weight of the solder. If the amount of Mn is less than 0.01% by weight, the resistance to electrode leaching is deteriorated, and in contrast, if it exceeds 0.2% by weight, the liquidus temperature increases to deteriorate melting properties. The amount of Mn is preferably in a range from 0.01 to 0.1% by weight, and more preferably in a range from 0.05 to 0.1% by weight.

The amount of Cr in the first and second invented Pb free solders is set to 0.01 to 0.2% by weight based on the total weight of the solder. If the amount of Cr is less than 0.01% by weight, the resistance to electrode leaching is deteriorated. In contrast, if it exceeds 0.2% by weight, the liquidus temperature increases to deteriorate melting properties. The amount of Cr is preferably in a range from 0.01 to 0.1% by weight, and more preferably in a range from 0.05 to 0.1% by weight.

In the first and second invented Pb free solders, the amount of Pd is set to 0.01 to 2% by weight based on the total weight of the solder. If the amount of Pd is less than 0.01% by weight, the resistance to electrode leaching is deteriorated, and in contrast, if it exceeds 2% by weight, the liquidus temperature increases to deteriorate melting properties. The amount of Pd is preferably in a range from 0.01 to 1% by weight, and more preferably in a range from 0.4 to 0.6% by weight.

The amount of Ag in the second and third invented Pb free solders is set to 0.5 to 9% by weight based on the total weight of the solder. If the amount of Ag is less than 0.5% by weight, a satisfactorily improved strength is not obtained. In contrast, if it exceeds 9% by weight, an excess $Ag_3Sn$ intermetallic compound deposits to decrease bonding strength, and the solder liquidus temperature increases to deteriorate melting properties. The content of Ag is preferably in a range from 1 to 6% by weight, and more preferably in a range from 3 to 5% by weight.

The amount of Cu in the first and third invented Pb free solders is set to 0.5 to 2% by weight based on the total weight of the solder. If the amount of Cu is less than 0.5% by weight, a satisfactorily improved strength is not obtained. In contrast, if it exceeds 2% by weight, excess $Cu_6Sn_5$ and $Cu_3Sn$ intermetallic compounds deposit to decrease bonding strength, and the solder liquidus temperature increases to deteriorate melting properties. The content of Cu is preferably in a range from 0.5 to 1.5% by weight, and more preferably in a range form 0.5 to 1% by weight.

The amount of Sb in the second invented Pb free solder is set to 0.5 to 5% by weight based on the total weight of the solder. If the amount of Sb is less than 0.5% by weight, a satisfactorily improved strength is not obtained. In contrast, if it exceeds 5% by weight, the elongation of the solder decreases to deteriorate thermal shock resistance and workability.

Typical transition metal conductors for use in the invention which are liable to spread in molten Sn include, for example, elementary substances of Cu, Ag, Ni, Au, Pd, Pt, and Zn. Alloys of these transition metals, such as Ag—Pd, Ag—Pt can also be employed. Elementary substances of Cu, Ag, and Ni, or alloys of these metals are more preferably employed. The invented Pb free solders can inhibit electrode leaching while maintaining satisfactory solderability and bonding strength even when they are used in articles containing such conductors liable to undergo electrode leaching.

To the transition metal conductor, glass frits, and various additives (e.g., metallic oxides) are added according to necessity. The invented soldered article can exhibit the above advantages if only the metallic composition as a conductive component is the above composition. A low-melting metal such as Bi or In may be added as a solder component to the solder in order to lower a working temperature. In this case, the invented solder can exhibit the same advantages as above.

In the present invention, the Pb free solder may further comprise, as a solder composition, incidental impurities in addition to the above components. Such incidental impurities include elements contaminated upon the manufacture of the solder or elements which the solder originally contains, such as Pb, Bi, Cu, and Na.

The invented soldered article can be easily produced, for example, by melting the above components to be added in a main component Sn to form a Pb free solder, shaping the Pb free solder into a ball, placing the solder ball on a part or on a substrate, applying a flux onto the solder ball, heating the solder ball at a predetermined temperature in the air to join the conductor of the part.

Generally, solders are soldered in a $N_2$ atmosphere to improve solderability in many cases. However, the invented solders have small contents of Co, Fe, Mn, Cr, and Pd, and can be soldered in the air.

The term "soldered article" as used herein means and includes whole articles including electronic parts themselves to be joined, and solder joints where conductors of such electronic parts are electrically or mechanically connected to each other. In typical examples of such soldered articles, a conductor formed on an element-mounted substrate is soldered with a conductor formed on an electronic part to electrically or mechanically connect the conductors, or electrodes of an electronic part element are soldered with each other to electrically or mechanically connect the electrodes.

Such element-mounted substrates include, but are not limited to, printed circuit boards made of a glass fabric based-epoxy (glass-epoxy), printed circuit boards made of phenol, ceramic substrates made of, for example, alumina, and substrates having an insulating film such as a ceramic on the surface of a metal. The conductors include, for example, printed circuit boards and other wiring circuits, terminal electrodes and lead terminals of electronic parts.

The invented Pb free solders and soldered articles thus prepared have a satisfactory solderability, a high bonding strength, and an excellent resistance to electrode leaching. A soldering temperature for these solders and soldered articles can be relatively freely set, and the soldering procedure has a good workability. In addition, the amounts of expensive elements for inhibiting electrode leaching such as Ag can be minimized.

The present invention will be further illustrated in detail with reference to several invented examples and comparative examples below, which are not intended to limit the scope of the invention.

EXAMPLES

Table 1 below shows solder compositions employed in the invented examples and comparative examples.

TABLE 1

|  | Sn | Pb | Co | Fe | Mn | Cr | Pd | Ag | Cu | Sb |
|---|---|---|---|---|---|---|---|---|---|---|
| Ex. |  |  |  |  |  |  |  |  |  |  |
| 1 | 94.99 |  |  |  |  |  | 0.01 |  |  | 5.00 |
| 2 | 94.90 |  |  |  |  |  | 0.10 |  |  | 5.00 |

TABLE 1-continued

| | Sn | Pb | Co | Fe | Mn | Cr | Pd | Ag | Cu | Sb |
|---|---|---|---|---|---|---|---|---|---|---|
| 3 | 94.80 | | | | 0.20 | | | | | 5.00 |
| 4 | 94.99 | | | | | 0.01 | | | | 5.00 |
| 5 | 94.90 | | | | | 0.10 | | | | 5.00 |
| 6 | 94.80 | | | | | 0.20 | | | | 5.00 |
| 7 | 96.40 | | | | 0.10 | | | 3.50 | | |
| 8 | 96.40 | | | | | 0.10 | | 3.50 | | |
| 9 | 98.80 | | 0.50 | | | | | | 0.70 | |
| 10 | 99.20 | | | 0.10 | | | | | 0.70 | |
| 11 | 99.20 | | | | 0.10 | | | | 0.70 | |
| 12 | 99.20 | | | | | 0.10 | | | 0.70 | |
| 13 | 98.80 | | | | | | 0.50 | | 0.70 | |
| 14 | 99.00 | | | | | | 0.50 | | 0.50 | |
| 15 | 97.50 | | | | | | 0.50 | | 2.00 | |
| 16 | 95.79 | | 0.01 | | | | | 3.50 | 0.70 | |
| 17 | 95.30 | | 0.50 | | | | | 3.50 | 0.70 | |
| 18 | 94.80 | | 1.00 | | | | | 3.50 | 0.70 | |
| 19 | 90.00 | | 0.50 | | | | | 9.00 | 0.50 | |
| 20 | 88.50 | | 0.50 | | | | | 9.00 | 2.00 | |
| 21 | 97.00 | | 0.50 | | | | | 0.50 | 2.00 | |
| 22 | 98.50 | | 0.50 | | | | | 0.50 | 0.50 | |
| Comp. Ex. | | | | | | | | | | |
| 1 | 95.00 | | | | | | | | | 5.00 |
| 2 | 96.50 | | | | | | | 3.50 | | |
| 3 | 99.30 | | | | | | | | 0.70 | |
| 4 | 95.80 | | | | | | | 3.50 | 0.70 | |

(% by weight)

The Pb free solders indicated in Table 1 were subjected to evaluations on resistance to electrode leaching upon soldering and on solderability. The results are shown in Table 2.

The resistance to electrode leaching was evaluated on the basis of a remaining electrode area. The remaining electrode area was calculated according to the capacitance variation method in the following manner. A single-platedcapacitor on which a Cu electrode (thickness: 3 μm) or a Ag electrode (thickness: 20 μm) was printed and fired was dipped in a solder; a difference in capacitance between before and after dipping; and the remaining electrode area was defined as the ratio of the difference to the capacitance before dipping. On the Cu electrode, the capacitance variation was determined after 10-second dipping, and on the Ag electrode which is liable to be leached, the capacitance variation was determined after 3-second dipping.

Soldering temperatures employed in the evaluations are also shown in Table 2.

In addition, the solderability was evaluated using a solder spreading rate determined in accordance with Japanese Industrial Standards (JIS) Z3197.

TABLE 2

| | | Remaining [%] | | Solder Spreading Rate [%] | Soldering Temperature [° C.] |
|---|---|---|---|---|---|
| | | Cu electrode | Ag electrode | | |
| Ex. | 1 | 99.0 | 74.2 | 70 | 280 |
| | 2 | 99.5 | 80.1 | 66 | 280 |
| | 3 | 99.4 | 79.2 | 60 | 280 |
| | 4 | 86.0 | 60.2 | 70 | 280 |
| | 5 | 98.4 | 63.0 | 67 | 280 |
| | 6 | 99.0 | 65.3 | 62 | 280 |
| | 7 | 99.2 | 89.7 | 64 | 250 |
| | 8 | 99.2 | 85.0 | 66 | 250 |
| | 9 | 99.7 | 52.0 | 71 | 260 |
| | 10 | 97.0 | 40.8 | 69 | 260 |
| | 11 | 99.5 | 68.9 | 65 | 260 |
| | 12 | 99.8 | 58.4 | 66 | 260 |
| | 13 | 99.6 | 53.2 | 72 | 260 |
| | 14 | 99.2 | 52.3 | 72 | 260 |
| | 15 | 99.5 | 50.1 | 78 | 330 |
| | 16 | 99.0 | 40.0 | 73 | 250 |
| | 17 | 99.6 | 64.7 | 74 | 250 |
| | 18 | 99.8 | 81.9 | 76 | 280 |
| | 19 | 99.6 | 87.2 | 82 | 330 |
| | 20 | 99.7 | 86.3 | 80 | 350 |
| | 21 | 99.5 | 33.8 | 79 | 330 |
| | 22 | 99.2 | 35.4 | 72 | 250 |
| Comp. Ex. | 1 | 7.0 | 0.0 | 70 | 280 |
| | 2 | 89.2 | 31.7 | 72 | 250 |
| | 3 | 92.5 | 0.0 | 71 | 260 |
| | 4 | 92.3 | 31.0 | 73 | 250 |

Table 2 shows that Pb free solders according to the invented examples showed higher remaining electrode areas on a Cu electrode and were effective for inhibiting electrode leaching, as compared with corresponding comparative examples having similar compositions. This is because additive elements such as Co, Fe, Mn, Cr, and Pd serve to inhibit electrode leaching. Particularly, the Pb free solders according to Examples 1 to 3 and Examples 5 to 22 exhibited remaining electrode areas of 95% or more and showed very satisfactory resistance to electrode leaching. In contrast, typical conventional Pb free solders according to Comparative Examples 1 and 2 showed remaining electrode areas not exceeding 90%. The Pb free solder according to Example 4 (Sn-0.01 wt % Cr-5.00 wt % Sb) showed a remaining of 86.0%, which was lower than those according to the other invented examples. This is because the Pb free solder in question had less contents of additive elements. However, even this Pb free solder showed a satisfactory inhibitory effect of electrode leaching as compared with the Pb free solder according to Comparative Example 1 (Sn-5.00 wt % Sb). All the compositions according to the invention can be employed depending on the soldering conditions.

The advantages of the invented examples were exerted more markedly in the Ag electrode than in the Cu electrode. All the solders according to the invented examples exhibited high remaining electrode areas and were effective to inhibit electrode leaching, as compared with corresponding comparative examples having similar compositions. This is because additive elements such as Co, Fe, Mn, Cr, and Pd serve to inhibit electrode leaching.

Specifically, when the Pb free solder according to Comparative Example 1 (Sn-5.00 wt % Sb) and Pb free solder according to Comparative Example 3 (Sn-0.70 wt % Cu) were used, the remaining of the Ag electrode was 0 (zero). In contrast, Pb free solders according to Examples 1 to 6 obtained by adding Mn or Cr to a Sn—Sb solder, and Pb free solders according to Examples 9 to 15 obtained by adding Co, Fe, Mn, Cr, or Pd to a Sn—Cu solder were used, the remaining electrode areas were 60.2 to 80.1%, and 40.8 to 68.9%, respectively.

Likewise, when the Pb free solder according to Comparative Example 2 (Sn-3.50 wt % Ag) was used, the remaining Ag electrode was 31.7%. In contrast, when the Pb free soldered according to Examples 7 and 8 obtained by adding Mn or Cr to the above composition were used, the remaining rates were 85.0 to 89.7%.

The Pb free solder according to Comparative Example 4 (Sn-3.50 wt % Ag-0.70 wt % Cu) exhibited a remaining rate of Ag electrode of 31.0%. In contrast, the Pb free solders according to Example 16 to 22 obtained by adding Co to the above composition exhibited a remaining rate of 33.8 to 86.3%.

On the solderability, the Pb free solders according to Examples 1, 4, 9, and 13 to 22 showed a very satisfactory solderability with a solder spreading rate of 70% or more. The Pb free solders according to Comparative Examples 1 to 4 also showed a very satisfactory solderability with a solder spreading rate of 70% or more.

In this connection, the Pb free solders according to Examples 3 and 6 exhibited lower solder spreading rates as compared with the solder having a similar composition according to. Comparative Example 1. In these solders, the contents of the added elements such as Co, Fe, Mn, Cr, and Pd were high and the liquidus temperature increased to deteriorate the fluidity of the solders. The Pb free solders according to Examples 2, 3, 5 to 8, 11, and 12 showed lower solder spreading rates than the solders according to the other examples. This is because Mn and Cr are liable to be oxidized. However, any of the compositions according to the invented examples can be used depending on the soldering conditions.

The solder spreading rate increased with increasing amounts of Sb, Ag, and Cu group as in the Pb free solder according to Example 15. This is because an increased soldering temperature which was increased with an increasing liquidus temperature affected the solder spreading rate.

Other embodiments and variations will be obvious to those skilled in the art, and this invention is not to be limited to the specific matters stated above.

What is claimed is:

1. A lead free solder consisting of:
   0.01 to 1% by weight of Co,
   0.5 to 9% by weight of Ag,
   0.5 to 2% by weight of Cu, and
   88.0% by weight or more of Sn.

2. A lead-free solder according to claim 1, consisting of:
   0.4 to 1% by weight of Co,
   3 to 5% by weight of Ag,
   0.5 to 1% by weight of Cu, and
   88.0% by weight or more of Sn.

3. A soldered article comprising an article containing a transition metal conductor and being joined through a solder, said transition metal conductor being liable to spread in molten Sn, wherein said solder is a lead free solder according to claim 1.

4. A soldered article according to claim 3, wherein said transition metal conductor comprises at least one selected from elementary substances or alloys thereof of the group consisting of Cu, Ag, Ni, Au, Pd, Pt, and Zn.

* * * * *